United States Patent [19]

Larsen

[11] Patent Number: 5,045,027

[45] Date of Patent: Sep. 3, 1991

[54] TORSIONALLY TUNED SPRING COUPLING AND DRIVE MECHANISM INCLUDING SAME

[75] Inventors: Ardean R. Larsen, Chillicothe; James E. Winzeler, East Peoria, both of Ill.

[73] Assignee: Caterpillar Inc., Peoria, Ill.

[21] Appl. No.: 390,941

[22] Filed: Aug. 7, 1989

[51] Int. Cl.[5] .......................... F16D 3/52; F16D 3/66
[52] U.S. Cl. ................................ 464/63; 192/106.2; 464/64
[58] Field of Search ........................ 464/63, 64, 68; 192/160.2, 70.17

[56] References Cited

U.S. PATENT DOCUMENTS

| | | | |
|---|---|---|---|
| 2,680,377 | 6/1954 | Gerst | 74/15.84 |
| 2,961,892 | 11/1960 | Spannhake | 74/574 |
| 3,101,600 | 8/1963 | Stromberg | 464/64 |
| 3,138,011 | 6/1964 | Stromberg | 464/64 |
| 3,216,104 | 11/1965 | O'Shields | 29/469 |
| 3,266,271 | 8/1966 | Stromberg | 464/64 |
| 3,586,185 | 6/1971 | Clancy et al. | 180/79.2 B X |
| 3,800,931 | 4/1974 | Maucher | 464/63 X |
| 4,139,995 | 2/1979 | Lamarche | 464/64 |
| 4,171,627 | 10/1979 | Fukuda | 464/63 |
| 4,269,296 | 5/1981 | Flotow et al. | 464/64 |
| 4,475,640 | 10/1984 | Takeuchi et al. | 192/106.2 X |
| 4,548,311 | 10/1985 | Lech, Jr. | 464/64 |
| 4,605,114 | 8/1986 | Goetz et al. | 192/106.2 |

OTHER PUBLICATIONS

Caterpillar Parts Booklet, 3508 Vehicular Engine Cover, and pp. 28, 32, and 33 (circa Oct., 1985).

*Primary Examiner*—Daniel P. Stodola
*Assistant Examiner*—William G. Battista, Jr.
*Attorney, Agent, or Firm*—Charles E. Lanchantin, Jr.; John W. Grant

[57] ABSTRACT

Large earthmoving vehicles require complex mechanisms for mechanically driving the auxiliary power units. The subject drive mechanism includes an elevating transfer gear train at the rear frame portion of the vehicle that drives a rear auxiliary power unit via an upper transfer gear, and that drives a front auxiliary power unit on the front frame portion of the vehicle through a relatively long drive shaft system extending from the upper transfer gear. A torsionally tuned spring coupling having a plurality of compression spring sets arranged in at least two circular arrays is incorporated between the engine and an input gear of the transfer gear train for providing two stiffness rates and effectively isolating the drive mechanism from the torsional excitation pulses of the engine and the effects of gear shifting of an associated transmission for powerably driving the vehicle.

3 Claims, 6 Drawing Sheets

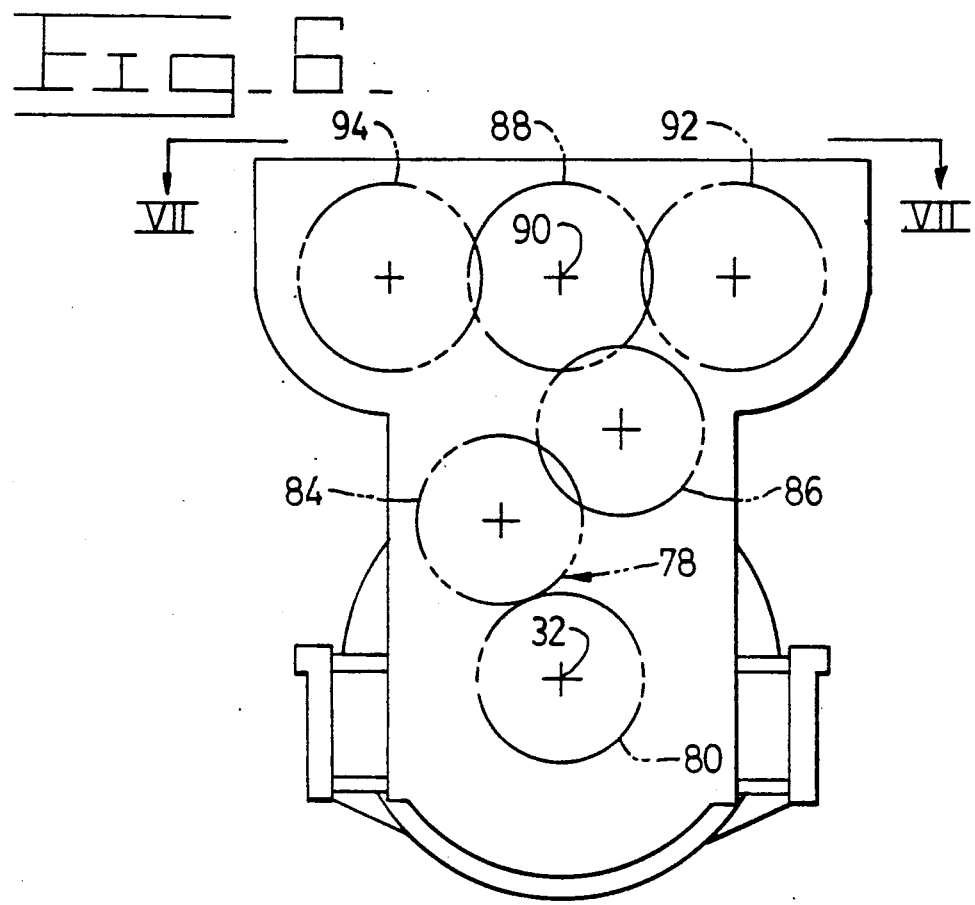
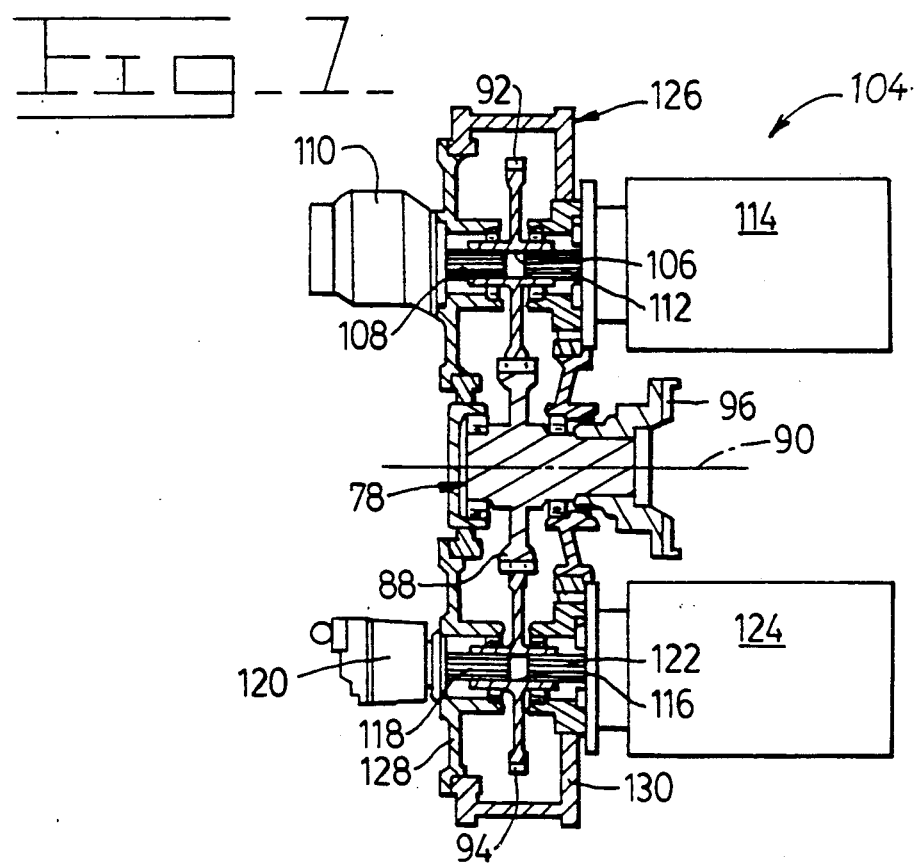

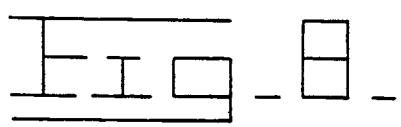
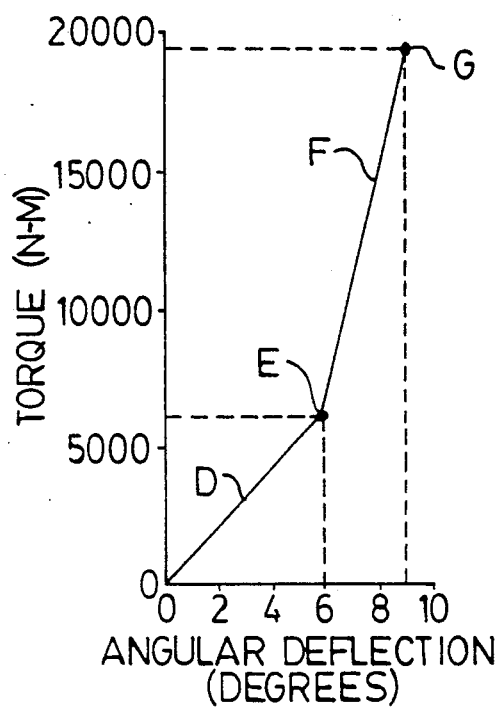
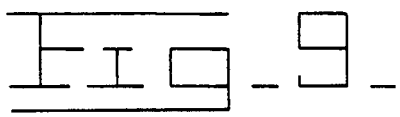
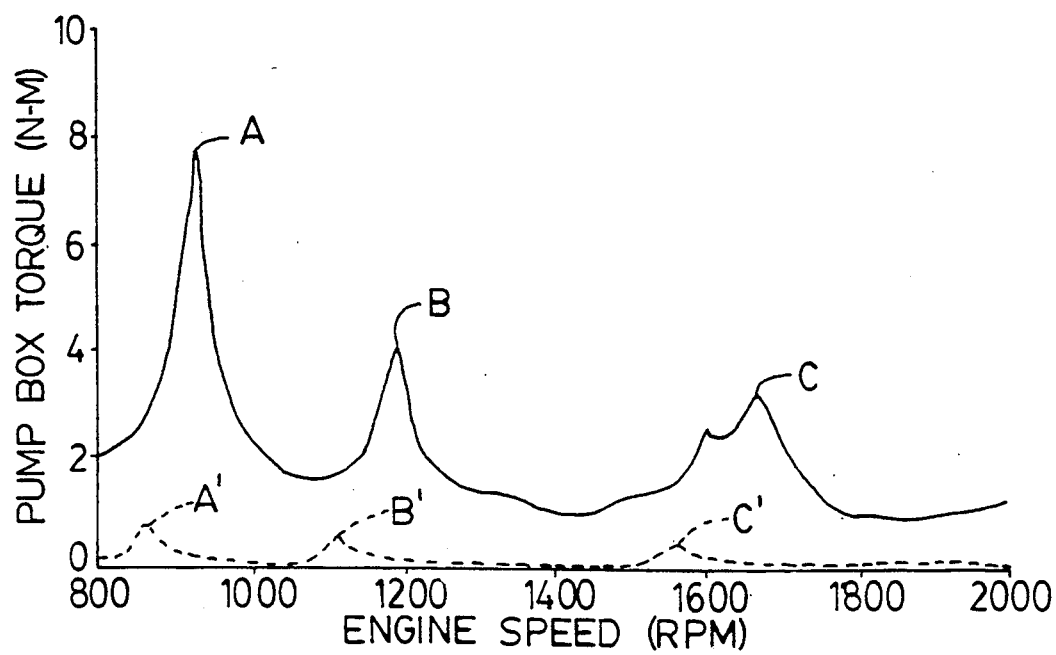

TORSIONALLY TUNED SPRING COUPLING AND DRIVE MECHANISM INCLUDING SAME

TECHNICAL FIELD

This invention relates to a torsionally tuned spring coupling useful in the drive mechanism of a vehicle, and more particularly to a high capacity spring coupling having two stiffness rates for effectively isolating the downstream portion of the drive mechanism from the torsional excitation pulses from an engine and the effects of gear shifting of an associated transmission in the drive mechanism.

BACKGROUND ART

Large earthmoving vehicles must not only transmit significant amounts of power through the power shift transmission to the driving wheels thereof, but also must transmit significant amounts of power to a plurality of auxiliary power units which typically are a number of hydraulic pumps. In a vehicle such as a wheel loader about half of the maximum available horsepower of the usual multicylinder diesel engine can be directed to a portion of these pumps for operation of the loader bucket. Moreover, additional power can simultaneously be directed to another portion of these pumps for operation of the steering system and other auxiliary purposes.

U.S. Pat. No. 3,586,185 issued to L. F. Clancy, et al on June 22, 1971 is illustrative of a large articulated wheel loader having a rear engine for driving a generator electrically connected to drive the wheels and for powering a plurality of hydraulic pumps located on both the rear frame and on the front frame. The bucket control system for that wheel loader includes a pair of large hydraulic pumps located on the front frame to avoid the requirement of running all of the implement hoses across the articulation joint between the main frames. In U.S. Pat. No. 3,586,185 these hydraulic pumps are mechanically driven by a front box via a front drive shaft which crosses the articulation joint. A rear gear box is driven by an undesirably elevated generator via a rear drive shaft, which rear drive shaft coaxially powers the front drive shaft.

When a mechanical drive mechanism is desired, rather than the electrical system mentioned above, the requirements change considerably. For example, where do you locate the gear train for driving the rear hydraulic pumps so that the loads therefrom are removed from the engine crankshaft bearings? Accordingly, the instant drive mechanism should provide a compact, economical and reliable drive box for these pumps that would be located in an optimum position intermediate the engine flywheel and the transmission input member, and that would not load the crankshaft bearings. Furthermore, the rear hydraulic pumps should be arranged on the drive box in a convenient and accessible location for servicing or the like, and the drive box should be compatible with another shaft system for driving the implement hydraulic pumps located on the front frame of the vehicle.

In addition to the aforementioned considerations, it was recognized that the shaft system for driving the front implement pumps would be relatively long and flexible so that a flexible coupling intermediate the engine flywheel and that front drive shaft would be required for reducing naturally excited engine pulses thereon. U.S. Pat. No. 2,961,892 issued to E. W. Spannhake on Nov. 29, 1960 recognized the need for a flexible coupling between the engine flywheel and an input shaft drivingly connected to a transmission on the one hand, and to a power take-off on the other hand. However, the flexible coupling of U.S. Pat. No. 2,961,892 is entirely unsatisfactory. That coupling includes a tubular rubber bushing and a friction type slip clutch arranged in parallel relation to the rubber bushing and axially loaded thereby. These rubber elements are unacceptable in high temperature environments because they deteriorate in use, and since their deterioration is accelerated in hot oil, special and costly provisions must be made to keep these elements dry and yet to dissipate the heat therefrom. Furthermore, in that patent the rubber bushing is ineffective when the slip clutch is holding the torque load therethrough, and torque is transmitted through the rubber bushing only when torque loads having an order of magnitude equal to or above net engine torque will cause the slip clutch to actually slip. That slip clutch setting is too high to adequately protect the components of the downstream portion of the drive mechanism.

Spring-type flexible couplings are widely used and have the advantage that they have no elastomeric elements to deteriorate. Borg-Warner Corporation of Chicago, Ill., has been active for many years in the development of spring couplings of various configurations as is exemplified by the following U.S. Pat. Nos.:

3,101,600 issued to C. V. Stromberg on Feb. 12, 1962.
3,138,011 issued to C. V. Stromberg on Aug. 17, 1962.
3,266,271 issued to C. V. Stromberg on Aug. 16, 1966.
4,139,995 issued to P. E. Lamarche on Feb. 20, 1979.

Of these, U.S. Pat. No. 3,101,600 is of interest from the standpoint that it includes two sets of spring couplings arranged in series in order to double the maximum amount of angular deflection possible without exceeding practical lengths of the compression springs.

Another reference of note is U.S. Pat. No. 4,171,627 issued to K. Fukuda on Oct. 23, 1979. It discloses a spring coupling wherein the drive torque is transmitted through a plurality of costly spring seats which support a plurality of compression springs arranged in side-by-side relation. While it can thereby handle more torque, that construction has only a single stiffness rate.

When using spring couplings it is desirable to make the spring rate thereof relatively low or soft in order to provide maximum isolation for the drive train under relatively steady state driving conditions throughout the entire operating speed range of the engine. But because of spring coil bending and various wear factors there are practical limits to the total amount of angular deflection that can be permitted, and when it is realized that torque loads above 6,779 Newton meters are sometimes experienced when making gear shifts it is further desirable to provide a relatively stiff coupling at the upper end of the torque range so as to absorb more energy prior to reaching the stage of maximum compression of the springs.

The present invention is directed to overcoming one or more of the problems as set forth above.

DISCLOSURE OF THE INVENTION

In one aspect of the present invention, a torsionally tuned spring coupling is provided between driving and driven members which includes first and second pairs of radially outer plates individually defining a plurality of first windows, and ring means for releasably connecting the outer plates to the driving member in an axially spaced apart manner and axially aligning the first windows in facing pairs. The spring coupling also includes two radially inner plates individually defining a plurality of second windows, and hub means for releasably connecting the inner plates to the driven member, locating each of the inner plates between the respective pair of outer plates, and axially aligning the second windows with the facing pairs of first windows. And still further, the spring coupling includes a plurality of compression spring sets seated in the first and second windows and arranged in at least two circular arrays, and with each spring set having an outer spring and an inner spring. A first plurality of the outer and inner springs is initially compressed to collectively provide a preselected tuning stiffness rate, and a second plurality of the outer and inner springs is subsequently compressed to collectively provide with the first plurality a cushioning stiffness rate greater than the tuning stiffness rate as torsional loads are transmitted in a parallel manner between the outer and inner plates.

In another aspect of the invention a drive mechanism of a vehicle includes an engine having an engine output member, a transmission having an input member and being shiftable between a plurality of gear ranges, an auxiliary power unit, and an input shaft connected to the transmission input member and adapted to drive the vehicle through a first power path. Transfer gear means is also provided for driving the auxiliary power unit through a second path including a transfer gear connected to the input shaft, and a torsionally tuned spring coupling is provided for connecting the engine output member to the input shaft. That spring coupling includes a plurality of compression spring sets arranged in at least two circular arrays, and with each set having an outer compression spring and an inner compression spring to provide a tuning stiffness rate to protect the drive mechanism from the dynamic pulse phenomena of the engine, and a cushioning stiffness rate greater than the tuning stiffness rate to protect the drive mechanism from the transient dynamics associated with shifting the transmission between the gear ranges thereof.

In still another aspect of the invention, a vehicle includes first and second frame portions that are articulatably connected together, an engine mounted on the first frame portion, and an auxiliary power unit mounted on the second frame portion. A drive mechanism is provided therefor which includes an input shaft driven by the engine along a first axis, a transfer gear train having an input transfer gear connected to the input shaft and an output transfer gear on the first frame portion on a second axis, a relatively long drive shaft assembly driven by the output transfer gear and extending between the first and second frame portions for driving the auxiliary power unit, and a torsionally tuned spring coupling connected between the engine and the input shaft.

In a still further aspect of the invention, a vehicle includes front and rear frame portions, and an engine having a flywheel member and a flywheel housing. A drive mechanism is associated therewith including an input shaft, coupling means for connecting the flywheel member to the input shaft, and transmission means for propelling the vehicle including a transmission input member driven by the input shaft. Advantageously, the drive mechanism also includes a transfer gear case connected to the flywheel housing and having a rear wall and a front wall, a transfer gear train within the transfer gear case including an input transfer gear mounted on the input shaft and arranged along a first axis, an output transfer gear arranged along a second axis, and left and right side gears, and an auxiliary power unit including a plurality of hydraulic pumps releasably connected to the walls and coaxially driven by the side gears.

Advantageously, the instant torsionally tuned spring coupling has side-by-side compression spring sets constructed to reduce the peak torques experienced in either the power path through the transmission to the wheels or the power path through a transfer gear train to the auxiliary power unit to less than 50% of peak engine torque. This is accomplished through a drive mechanism having relatively simple elements arranged in a compact package, and which elements have no substantive deterioration in a hot oil environment.

BRIEF DESCRIPTION OF THE DRAWINGS

FIG. 6 is a diagrammatic outline drawing of the flywheel, and the transfer gear means as taken along line VI—VI of FIG. 3;

FIG. 7 is a diagrammatic top plan view of the transfer gear means illustrated in FIG. 6 as taken along line VII—VII thereof, and showing the rear pump apparatus driven thereby;

FIG. 8 is a graph showing the theoretical dual rate deflection curve for the torsionally tuned spring coupling shown in FIGS. 3-5; and FIG. 9 is a theoretical vibration curve for the drive mechanism of FIGS. 1 and 2 when incorporating a sixteen cylinder diesel engine, and showing in a solid line the expected excitation bands without the spring coupling of the present invention, and showing in a broken line the expected excitation bands with the spring coupling of the present invention.

BEST MODE FOR CARRYING OUT THE PRESENT INVENTION

Figure 1:
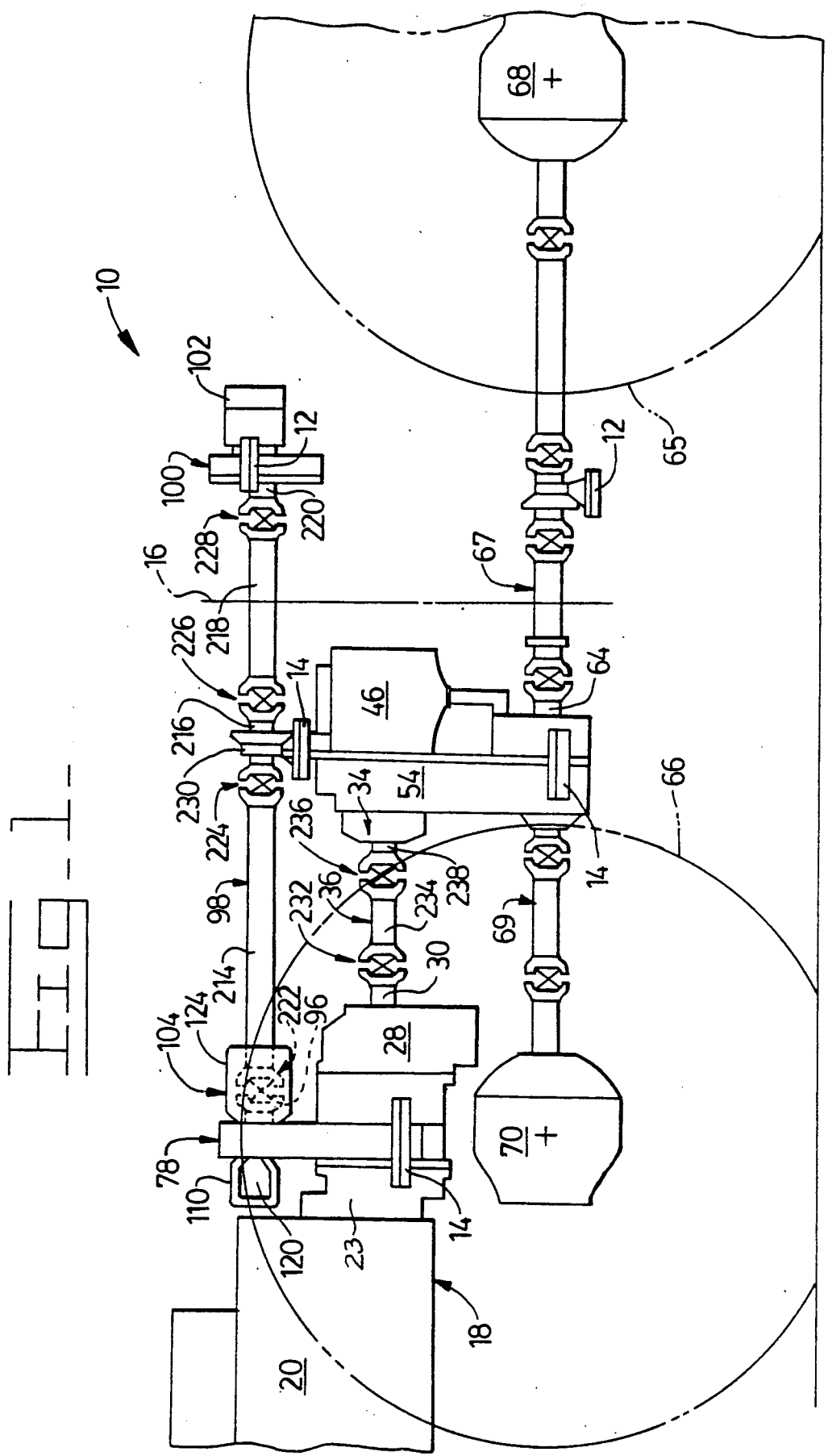
FIG. 1 is a diagrammatic side elevational view of a vehicle showing primarily only the major elements of the drive mechanism of the present invention in outline form.

Fragmentary portions of an articulated vehicle 10 such as an earthmoving wheel loader or the like are shown in outline form in FIG. 1. These vehicles typically have a front frame portion 12 and a rear frame portion 14 pivotally connected together for steering movement about a vertical pivot axis 16.

Figure 2:
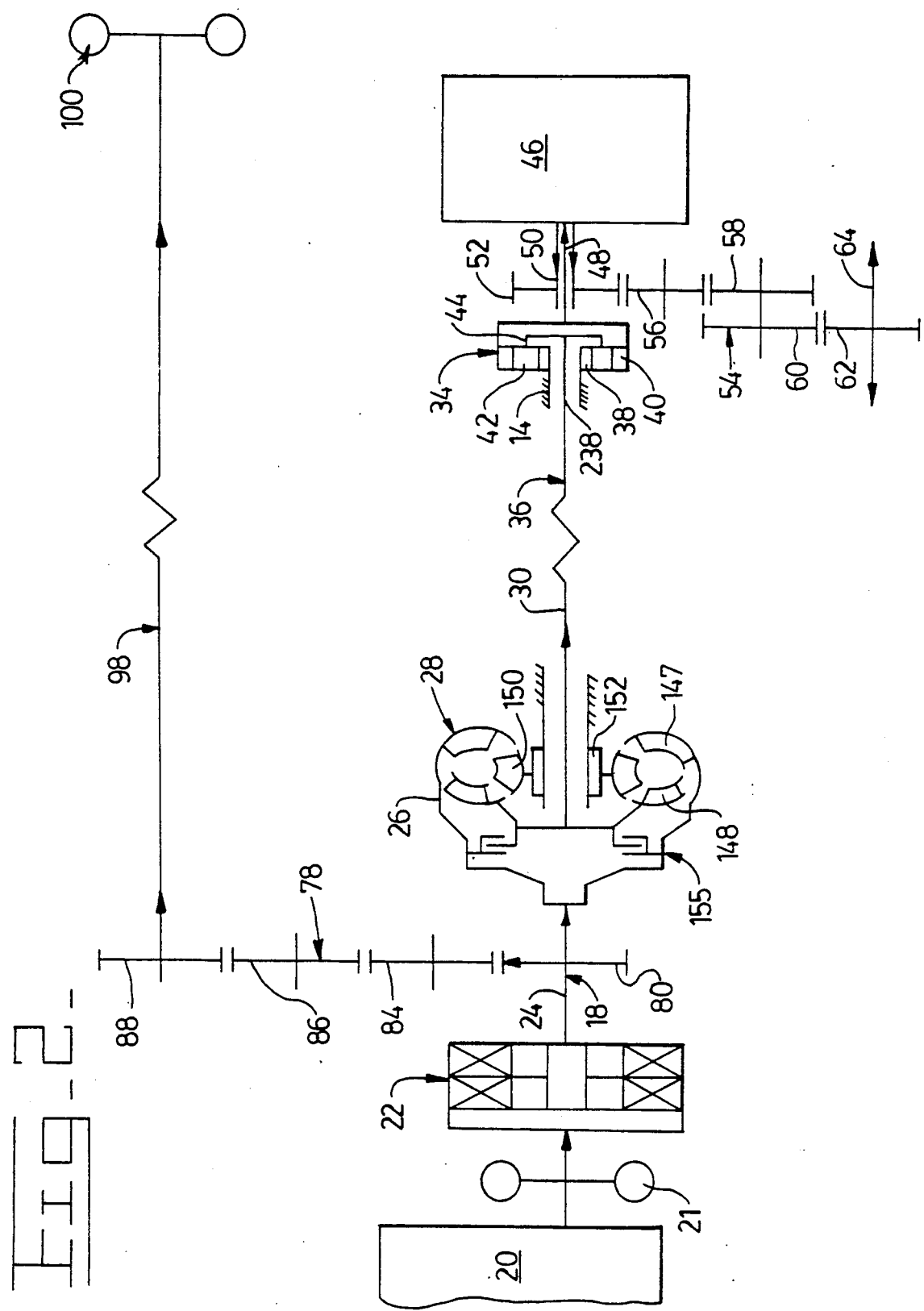
FIG. 2 is a schematic line drawing of the major elements of the drive mechanism shown in FIG. 1 showing how they are connected in two power paths.
Figure 3:
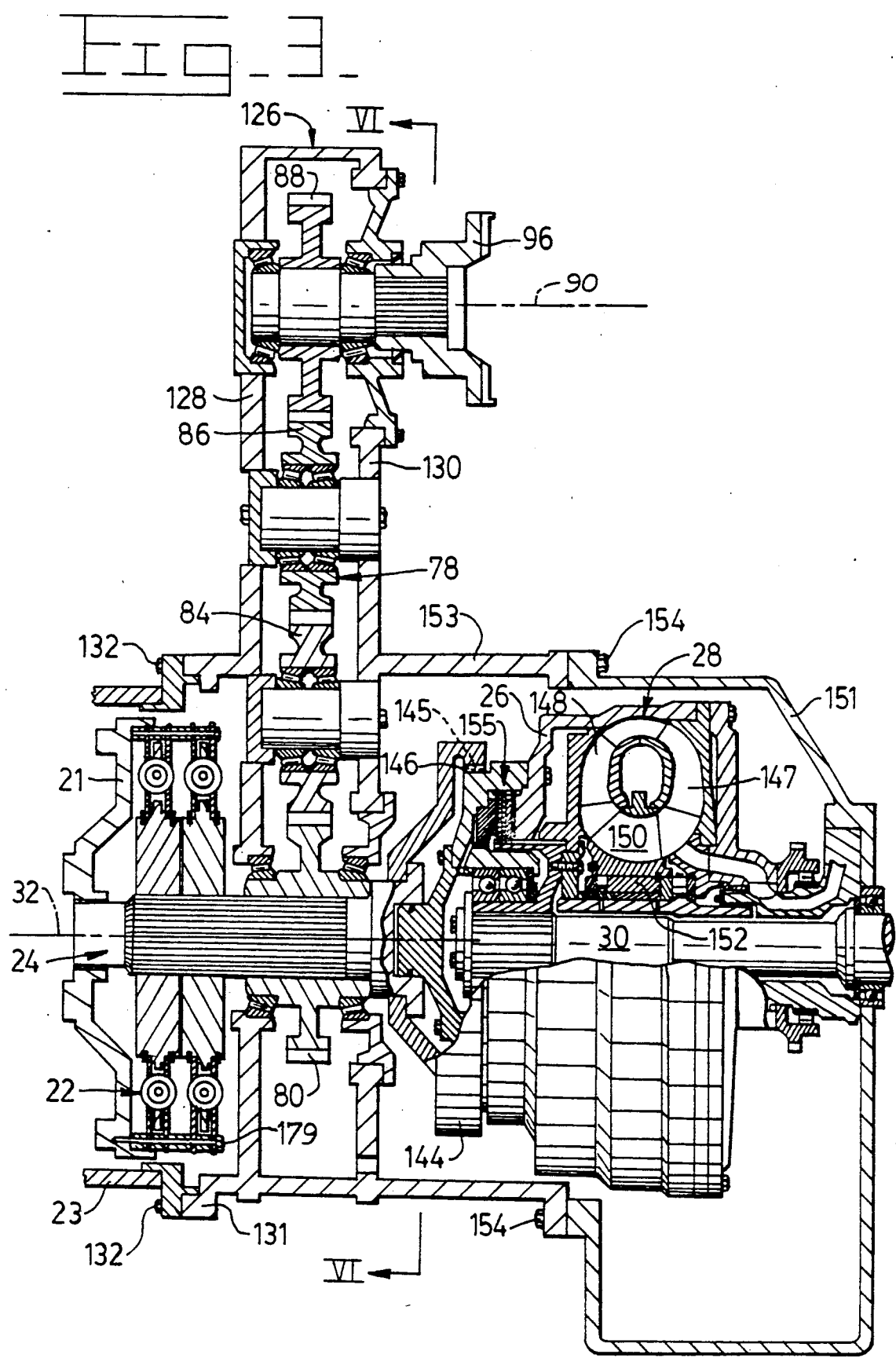
FIG. 3 is an enlarged, cross sectional side view of the central portion of the drive mechanism shown in FIGS. 1 and 2.

A drive mechanism 18 is illustrated in FIGS. 1 and 2 for driving the vehicle along a first power path includes a multicylinder diesel engine 20 having an output element such as a driving flywheel member 21 as is shown in FIG. 3. The flywheel member is rotatably supported by the engine crankshaft bearings in the usual way, although such bearings are not shown in FIG. 3. A torsionally tuned spring coupling 22 is releasably connected to the flywheel member 21 radially within a flywheel housing 23 and to a driven input shaft 24 leading to a transmission input member 26. In the present embodiment, the transmission input member is a rotating housing of a hydrodynamic torque converter 28. The torque converter has an output shaft 30 which is coaxially arranged with the input shaft 24 along a central axis 32, and which is serially connected to a speed-increasing planetary gear set 34 through an intermediate shaft system 36 as is schematically shown in FIG. 2. The planetary gear set 34 includes a sun gear 38 suitably connected to the rear frame 14 and held stationary, an output ring gear 40, and a plurality of planet gears 42 intermeshingly engaged with the sun and ring gears. The planetary gear set also includes a planet carrier 44 rotatably supporting the planet gears 42, and which is normally driven by the shaft system 36. The drive mechanism 18 further includes a conventional power shift transmission 46 of the type capable of being shifted between a plurality of forward speeds, a plurality of reverse speeds, and a neutral position. The transmission 46 has an input shaft 48 driven by the ring gear 40 of the planetary gear set 34 at a speed slightly greater than the speed of the shaft system 36, and a tubular output shaft 50 connected to rotate with an upper transfer gear 52 of a depending gear set 54. That gear set also includes second and third gears 56 and 58 serially connected to the upper transfer gear 52, a fourth gear 60 connected to rotate with the third gear, and a fifth gear 62 serially driven by the fourth gear for powerably rotating a lower drive shaft 64. As can be appreciated by reference to FIG. 1, the lower drive shaft 64 can be coupled to a front pair of wheels 65 and a rear pair of wheels 66 respectively by a lower front shaft system 67 and a front axle 68, and by a lower rear shaft system 69 and a rear axle 70 in any well known manner.

Figure 4:
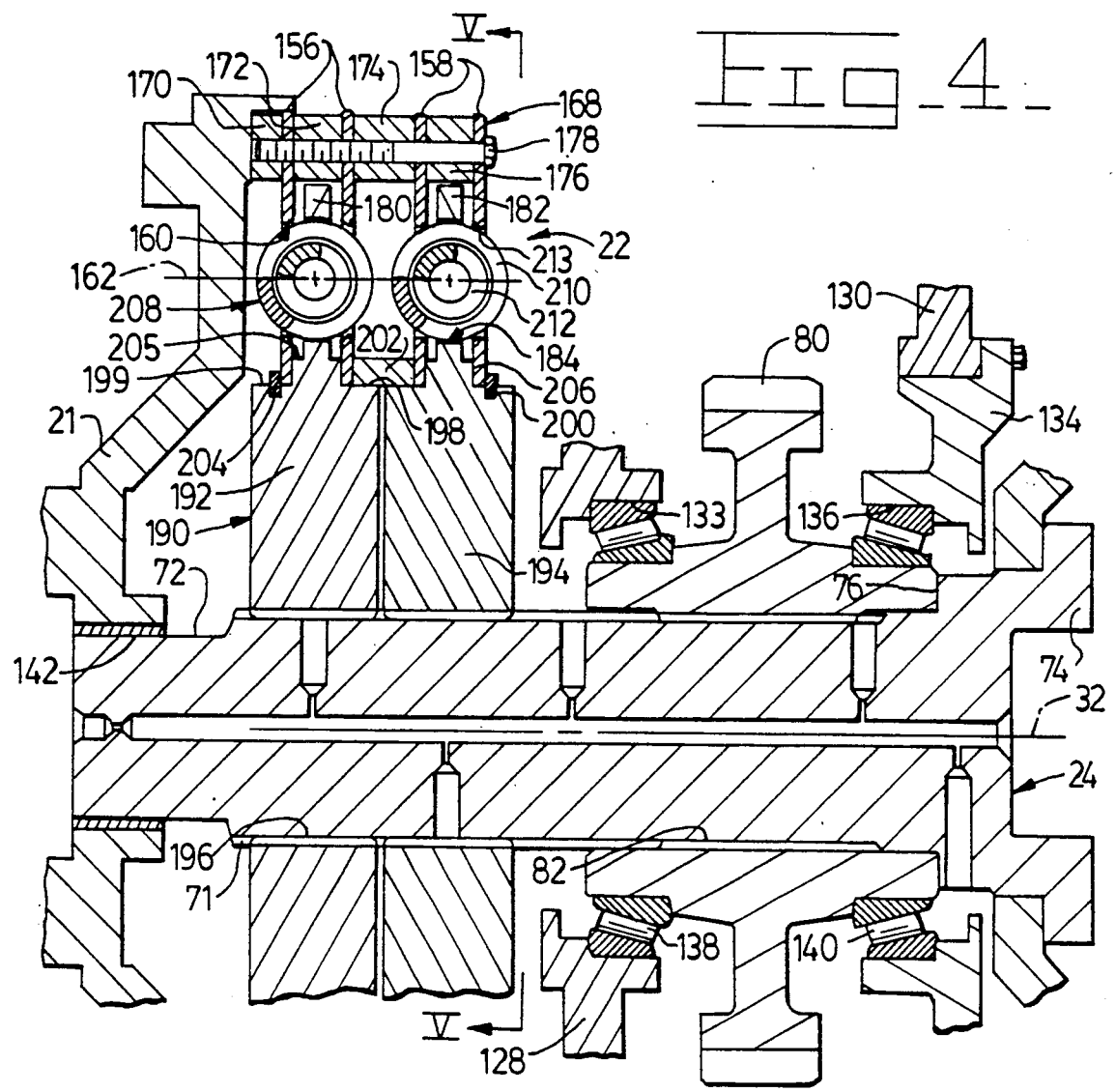
FIG. 4 is a further enlarged, fragmentary view of a portion of FIG. 3 illustrating the torsionally tuned spring coupling thereof, the input shaft, and the input transfer gear in greater detail.

The input shaft 24 shown in FIG. 4 has an elongate centrally located external spline 71, a reduced diameter cylindrical nose portion 72 at the rear end thereof, and an enlarged diameter flanged portion 74 at the front end thereof that is separated from the spline by an annular thrust shoulder 76. As is shown in FIGS. 2, 3, 6 and 7, the drive mechanism 18 includes transfer gear means or an elevating transfer gear train 78 driven by the input shaft 24 along a second power path. As best shown in FIG. 4, the transfer gear means includes an input or first transfer gear 80 having an internal spline 82 which is intermeshingly engaged with the external spline 71 of the input shaft. As is shown in FIG. 6, the input transfer gear 80 is adapted to serially drive a second gear 84, a third gear 86, and an output or fourth gear 88 rotatable about an upper axis 90 at a speed approximately 1.06 times that of the first transfer gear 80 or of the engine 20. Left and right side gears 92 and 94 are driven by the fourth gear 88 at the same elevational relationship as the upper axis 90, and an output coupling yoke 96 is disposed on the front end thereof as is shown in FIGS. 1 and 7. That coupling yoke drives a relatively long and flexible upper shaft system 98 arranged along the upper axis 90 when the vehicle 10 is traveling in a longitudinal direction, and thereby powers a front auxiliary power unit or front pump drive apparatus 100 disposed on the front frame portion 12. In this embodiment the front auxiliary power unit includes three relatively large capacity hydraulic pumps 102 disposed in side-by-side relation and extending forwardly from the front thereof, only one of which is illustrated. These front pumps are continuously driven by the upper shaft system 98 to provide pressurized fluid for manipulating a conventional earthmoving implement such as a loader bucket mounted on the front of the vehicle, and not illustrated. Two other small capacity pumps extend rearwardly from the rear of the front auxiliary power unit 100 and are driven thereby, although they are not shown in the drawings.

A rear auxiliary power unit or rear pump drive apparatus 104 is also powered by the transfer gear means 78, which includes the gears 88, 92 and 94, as can be appreciated by reference to FIGS. 6 and 7. Particularly, the left side gear 92 has an internal spline 106 adapted to drive a rear shaft 108 of a steering brake cooling pump 110 and a front shaft 112 of a relatively large steering pump 114. In a similar manner the right side gear 94 has an internal spline 116 adapted to drive a rear shaft 118 of a brake pressure charging pump 120 and a front shaft 122 of another steering pump 124 which is a duplicate of the steering pump 114.

As is shown in FIG. 3, the transfer gear means 78 are disposed in a transfer gear case 126 having a vertical rear wall 128 and a vertical front wall 130 oriented perpendicular to the longitudinal axis 32. The rear wall 128 is releasably secured to the flywheel housing 23 by an annular mounting flange 131 rigidly secured to the rear wall and a plurality of fasteners or bolts 132. As is illustrated in FIG. 4, an annular bearing seat 133 is formed in the rear wall, and an annular adapter plate 134 having another annular bearing seat 136 is releasably secured to the front wall. An opposed pair of tapered roller bearings 138 and 140 is disposed in these bearing seats and arranged along the central axis 32 for rotatably supporting the first transfer gear 80. Thus the input shaft 24 is rotatably supported within the case by these bearings through the intermeshing splines 71 and 82. An optional bearing sleeve or bushing 142 can be disposed within the flywheel member 21 to stabilizingly support the rear nose portion 72 of the input shaft, if desired. However, it is to be appreciated that the tapered roller bearings 138 and 140 would still carry the major gear loads under such conditions, and the radial loads on the flywheel member 21 would be low.

Referring to FIG. 3, the drive mechanism 18 includes an enlarged coupling flange 144 having an internal spline 145, and which flange is rigidly secured to the front end of the input shaft 24. The rotating housing 26 of the torque converter 28 has an external spline 146 driven by the internal spline 145 of the coupling flange 144. As is the usual case, the torque converter has a multi-bladed pump element 147 secured to and driven by the rotating housing 26, a multi-bladed turbine element 148 secured to and driving the output shaft 30, and a multi-bladed reaction element 150 preferably secured to a torque converter housing 151 through an overrunning or one-way clutch assembly 152. The torque converter housing 151 is releasably secured to a cylindrical wall 153 welded or otherwise rigidly secured to the front wall 130 by a plurality of fasteners or bolts 154, so that the transfer gear case 126 serves to support them all on the rear frame 14 shown in FIG. 1. In the instant example the torque converter also has a direct drive or lock-up clutch 155 of conventional construction. When this lock-up clutch is disengaged power is transmitted solely hydraulically through the torque converter, and thereafter is mechanically transmitted from the output shaft 30 thereof to the wheels 65 and 66. When the lock-up clutch 155 is fully engaged, the converter output shaft 30 is coupled for direct rotation with the rotating housing 26 and this provides solely a direct mechanical drive to the wheels and a power path of greater efficiency as is well known in the art. Moreover, although not illustrated, a disc type rotating clutch could be incorporated between the input rotating housing and the converter pump elements 147 without departing from the spirit of the present invention. Such an impeller clutch could be controllably disengaged during shifting gears of the transmission 46 shown in FIG. 1 in a conventional manner to reduce shocks on the drive mechanism and increase the service life of the transmission.

The torsionally tuned spring coupling 22 of the present invention not only protects the drive mechanism 18, including both the lower drive path to the wheels 65 and 66 and the upper drive path to the rear auxiliary power unit 104 and the front auxiliary power unit 100, from the dynamic pulse phenomena emanating from the diesel engine 20, but also from the transient dynamics associated with shifting the transmission 46 between the gear ranges thereof when the lock-up clutch 155 is engaged.

Figure 5:
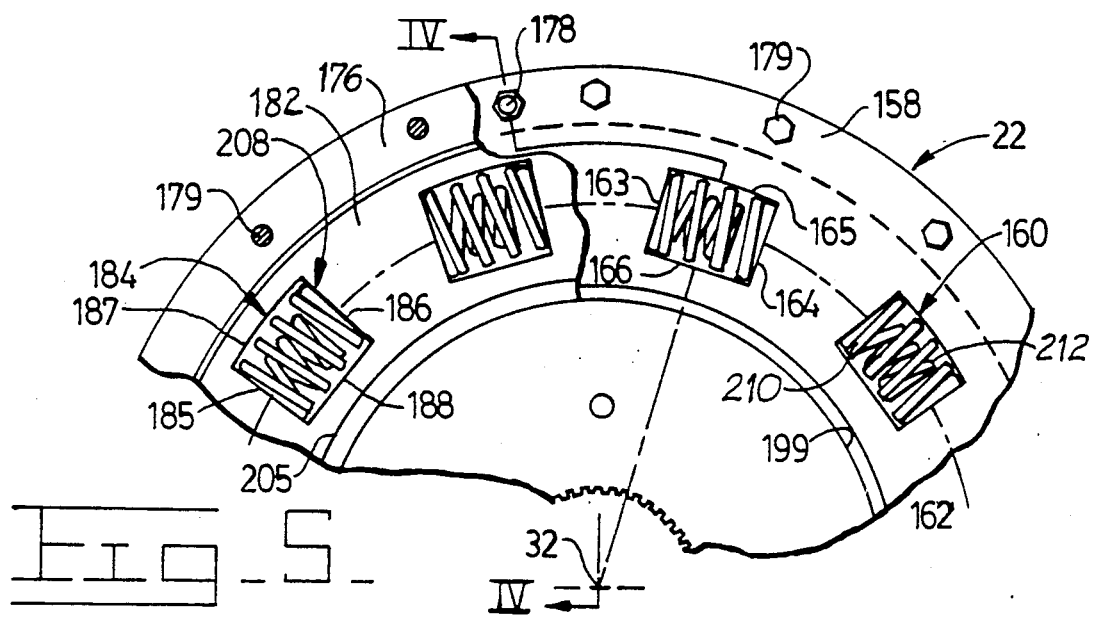
FIG. 5 is a fragmentary end view of the spring coupling as taken along the line V—V of FIG. 4.

As is shown best in FIGS. 4 and 5, the spring coupling 22 includes first and second pairs of radially outer plates 156 and 158 individually defining a plurality of first windows 160 of a nearly rectangular shape. These windows are preferably uniformly spaced about a common theoretical cylindrical surface 162, and each one has circumferentially opposite end surfaces 163 and 164 that deviate slightly from being parallel by a preselected angle from the central axis 32. Each of the first windows 160 also has radially outer and inner spring containment surfaces 165 and 166 respectively. Ring means 168 are provided to releasably secure the outer plates 156 and 158 to the engine flywheel member 21 in a stacked manner. In this embodiment the ring means includes first, second, third and fourth rings 170, 172, 174, and 176 respectively, which are connected together with the outer plates in a subassembly by a first plurality of fasteners or bolts 178 screwthreadably received in the rear or first ring 170. Although not shown in FIG. 4, a second plurality of elongate fasteners or bolts 179 extend through the subassembly and are screwthreadably received in the flywheel member 21.

The spring coupling 22 further includes first and second radially inner plates 180 and 182 individually defining a plurality of second windows 184 of a nearly rectangular shape. These second windows are also preferably arranged uniformly and symmetrically about the common cylindrical surface 162, and with each window having circumferentially opposite end surfaces 185 and 186 that deviate slightly from being parallel by a preselected angle from the central axis 32. The windows 184 are further defined by radially outer and inner spring containment surfaces 187 and 188. In this embodiment hub means 190 are provided for releasably connecting the inner plates 180 and 182 to the driven input shaft 24 in a stacked manner. Preferably, the hub means 190 includes a pair of separable hubs 192 and 194 having the inner plates integrally formed therewith. Each of the hubs has an internal spline 196 adapted to intermeshingly engage the external spline 71 formed on the input shaft 24, and axially inner and outer cylindrical surfaces 198 and 199 respectively with annular grooves 200 formed only on the axially outer ones thereof. The hubs are juxtaposed so that a cylindrical centering sleeve 202 can be engaged with the inner surfaces 198 to properly position both hubs concentrically with respect to the central axis 32 and to better align the hubs when they are initially assembled onto the external spline 71. A split retaining ring 204 is disposed in each of the grooves 200 as an aid in keeping the hubs centered between the pairs of outer plates 156 and 158 respectively. Moreover, a secondary set of axially inner and outer cylindrical surfaces 205 is defined on each of the hubs 192 and 194 radially inwardly of the windows 184 and radially outwardly of the first set 198,199 to provide flat annular side faces 206 for thrust and centering purposes. Thus, in connection with the rear hub 192, the rear outer plate 156 is entrapped between the rear retaining ring 204 and the rearwardly facing side face 206, and the front outer plate 156 is entrapped between the forwardly facing side face 206 and the centering sleeve 202. The front hub 194 has a similar arrangment, only in reverse order.

The spring coupling 22 also includes a plurality of similar spring sets 208 which are disposed within the axially aligned windows 160 and 184. In the instant embodiment ten spring sets are associated with each of the hubs 192 and 194, such that they are arranged in two circular arrays on the common cylindrical plane 162. Each spring set has an outer compression spring 210 and an inner compression spring 212 located radially within the outer spring. The outer springs are seated directly against the end surfaces 163,164,185 and 186 in a substantially line-to-line relationship when no torque is being transmitted by the spring coupling 22, whereas the inner springs are circumferentially spaced away from a load transferring relationship between the inner plates 180,182 and the outer plates 156 and 158 at this same time. As is shown in FIG. 4, each of the pairs of outer plates 156 and 158 have upper and lower chamfered or bevelled edges 213 of the first windows 160 on the inner surfaces facing the outer springs 210 to better contain them.

FIG. 1 shows the upper shaft system 98 which includes first, second, third and fourth shafts 214, 216, 218 and 220 that are respectively joined in series to the coupling yoke 96 by first, second, third and fourth universal joints 222, 224, 226 and 228 as are diagrammatically illustrated. Since the upper shaft system is long and extends across the articulation axis 16, an intermediate pillow block 230 is secured to the rear frame 14 to support the second shaft 216. In a like manner the intermediate shaft system 36 includes the converter output shaft 30, a rear universal joint 232, an intermediate shaft 234, a front universal joint 236, and a front shaft 238 connected for conjoint rotation with the planet carrier 44 shown in FIG. 2. The lower shaft systems 67 and 69 have similar constructions, so a specific description thereof is unnecessary.

INDUSTRIAL APPLICABILITY

In operation, eight of the sixteen cylinders of the diesel engine 20 fire every revolution of the engine output element 21. The engine also has a preferred range of operating speeds of from 1200 to 1600 rpm, and natural frequencies of vibration. With the lock-up clutch 155 of the torque converter 28 engaged to provide a mechanical drive, a predicted torsional analysis of the gear mesh response was made of the drive mechanism 18 without the spring coupling 22 of the present invention, and this theoretical curve is shown in a solid line in FIG. 9. Specifically, the peak torque levels expected in the long and flexible upper shaft system 98 leading to the front pump drive apparatus 100 are noted in Newton meters vertically on the chart, and the range of speeds of the engine's output element 21 are noted in rpm's horizontally across the chart for a specified range of speeds. First, second and third torque spikes, identified by the letters A, B and C respectively on the solid line curve can be noted in the 925, 1200 and 1675 rpm excitation bands. The torque spikes A, B and C correspond to the 4½ order, the 3½ order, and the 2½ order of the engine firing frequency, and have a cycle frequency of 69 Hertz and are unacceptable. In this example, the peak engine torque was approximately 7,000 Newton meters, and the worst torque spike A was predicted to be above that figure.

However, with the torsionally tuned spring coupling 22 of the present invention in the drive mechanism 18, the predicted vibration curve shown by the broken line in FIG. 9 was reduced to an entirely acceptable torque level that would contribute to a long service life thereof. It can be noted that the excitation bands A', B' and C' have been lowered slightly in frequency to approximately the 850, 1125 and 1550 rpm excitation bands. Simultaneously, the highest peak torque value has been reduced to only about 900 Newton meters.

FIG. 8 is a graph showing the theoretical deflection curve for the spring coupling 22 of the present invention. Increasing torque loads transmitted solely through the outer springs 210 will cause a relatively uniform angular deflection rate between the outer plates 156 and 158 and the inner plates 180 and 182 shown in FIG. 4. This first relatively moderate stiffness rate is comparable to the slope of the straight line identified by the letter D in FIG. 8, and that rate is maintained to an angular deflection value of approximately six degrees as indicated directly vertically below the so-called break point identified by the letter E. At that level of transmitted torque the inner springs 212 are also compressed so that the spring rate is increased to a relatively high stiffness rate as can be noted by the slope of the straight line identified by the letter F. In use, deflection values below approximately 6 degrees in the first portion of the deflection curve will normally provide a so-called tuning stiffness rate that will fully protect the drive mechanism from the dynamic pulse phenomena of the engine 18. Deflection values above approximately 6 degrees, or to the right of the letter E when viewing FIG. 8 into the second portion of the deflection curve, will provide a so-called cushioning stiffness rate that will protect the drive mechanism from the transient dynamics associated with shifting of the gears of the multi-speed transmission 46. At the top of the deflection curve identified by the letter G, at least one set of the springs 210 and/or 212 are constructed to become solid. That is, for example, that all of the outer springs 210 will be fully compressed between the end surfaces 163 of the outer plates 156 and 158 and the end surfaces 186 of the inner plates 180 and 182 as the engine output element 21 and ring means 168 rotate about the axis 32 in a clockwise direction when viewing FIG. 5. Preferably, the end surfaces 163 and 186, and also 164 and 185 are constructed to be disposed in parallel relation when the outer springs 210 are fully compressed for more direct or in-line loading thereof and for reducing wear.

The spring coupling 22 shown in FIG. 4 can be simply handled as a unitary subassembly during the manufacturing process or during servicing because the bolts 178 positively hold the ring means 168 and/or the outer plates 156 and 158 in a stack. The outer plates contain the inner plates 180 and 182, the spring sets 208, and the hubs 192 and 194, so that the subassembly is easy to install on the external spline 71 of the input shaft 24 and on the flywheel member 21.

In view of the foregoing, it can be appreciated that the torsionally tuned and dual stiffness rate spring coupling 22 of the present invention is simple in construction and easy to service, is reliable in operation, and is fully mechanical to avoid the problems associated with deterioration of elastomeric elements. And by incorporating at least two circular arrays of compression spring sets 208 the spring coupling has sufficient capacity to protect the power path from the engine 20, through the transmission 46 to the wheels 65 and 66, and also to protect the auxiliary power path through the transfer gear means 78 to the rear pump drive apparatus 104 and to the front pump drive apparatus 100 via the long upper drive shaft system 98. Moreover, it can absorb dynamic engine pulsations and transient transmission shifting shocks while transmitting relatively large amounts of torque. In that regard the tuning stiffness rate is preferably above about 30,000 Newton meters per radian of angular deflection between the driving and driven members of the spring coupling, and the cushioning stiffness rate is preferably above about 125,000 Newton meters per radian of angular deflection in order to limit the required travel while still attaining the required torque capacity. Simultaneously, the tuning stiffness rate is preferably maintained below about 100,000 Newton meters per radian of angular deflection and the cushioning stiffness rate is preferably maintained below about 400,000 Newton meters per radian of angular deflection in order to limit the peak oscillatory torques. With such stiffness rates it is expected that the peak oscillatory torques experienced in either the power path to the wheels 65 and 66 or the power path through the gear transfer train 78 to the front and rear auxiliary power units 100 and 104 will be effectively limited to less than 50% of peak engine torque, and preferably to only about 15-20%. Also, the spring coupling 22 is constructed to become solid at a maximum angular deflection value below about 10 or 12 degrees in order to minimize wear between the outer springs 210 and the plates 156, 158, 180 and 182 along the containment surfaces 165, 166, 187 and 188 of the windows 160 and 184. And furthermore, the drive mechanism 18 incorporates the gear transfer train 78 and associated gear transfer case 126 connected to the flywheel housing 23 so as to position the upper transfer gear 88 in a particularly effective location so as to compactly drive the rear pump drive apparatus 104 and the front pump drive apparatus 100.

Other aspects, objects, and advantages of this invention can be obtained from a study of the drawings, the discloseure, and the appended claims.

We claim:

1. A torsionally tuned spring coupling adapted to be releasably connected between a driving member and a driven member having an external spline, comprising:
   first and second pairs of outer plates individually defining a plurality of first windows;
   ring means for releasably securing the pairs of outer plates to the driving member in a fixed axially spaced apart relationship and axially aligning the first windows in facing pairs about a common hypothetical cylindrical surface;
   two inner plates individually having an integral hub which defines an internal spline connected to the external spline of the driven member, each of the hubs having first axially inner and outer cylindrical surfaces and second axially inner and outer cylindrical surfaces radially outwardly thereof defining flat annular side faces therebetween with the faces on the hub of the first inner plate being disposed between the outer plates of the first pair of outer plates and the faces on the hub of the second inner plate being disposed between the outer plates of the second pair of outer plates, each of the inner plates being located between the respective pair of outer plates and defining a plurality of second windows individually axially aligned with the facing pairs of first windows;

a cylindrical centering sleeve engaged with the juxtaposed first axially inner cylindrical surfaces of the hubs and serving to center the hubs concentrically; and a plurality of compression spring sets seated in the first and second windows and arranged in at least two circular arrays generally about the common hypothetical cylindrical surface, each of the spring sets having an outer spring and an inner spring disposed within the outer spring, a first plurality of the outer and inner springs being initially compressible to collectively provide a preselected tuning stiffness rate, and a second plurality of the outer and inner springs being subsequently compressible to collectively provide with the first plurality a cushioning stiffness rate greater than the tuning stiffness rate as torsional loads are transmitted in a parallel manner between the outer plates and the inner plates.

2. The spring coupling of claim 1 wherein all of the outer springs are initially compressed to collectively provide the preselected tuning stiffness rate, and the tuning stiffness rate is above about 30,000 Newton meters per radian of angular deflection between the driving and driven members.

3. The spring coupling of claim 2 wherein the cushioning stiffness rate is above about 125,000 Newton meters per radian of angular deflection, and is provided by the compression of all the outer springs and all the inner springs.

* * * * *

UNITED STATES PATENT AND TRADEMARK OFFICE
CERTIFICATE OF CORRECTION

PATENT NO. : 5,045,027
DATED : September 3, 1991
INVENTOR(S) : Ardean R. Larsen

It is certified that error appears in the above-identified patent and that said Letters Patent is hereby corrected as shown below:

On the title page under item "[75] Inventors:",
delete "James E. Winzeler, East Peoria, both".

Signed and Sealed this

Second Day of March, 1993

Attest:

STEPHEN G. KUNIN

Attesting Officer

Acting Commissioner of Patents and Trademarks